United States Patent [19]

Greene et al.

[11] 4,161,396

[45] Jul. 17, 1979

[54] METHOD AND APPARATUS FOR PROCESSING HEAT-SOFTENED FIBER-FORMING MATERIAL

[75] Inventors: Neil E. Greene, Granville; Seshadri Srinivasan, Pickerington; Leonard A. Stenger, Granville, all of Ohio

[73] Assignee: Owens-Corning Fiberglas Corporation, Toledo, Ohio

[21] Appl. No.: 887,705

[22] Filed: Mar. 17, 1978

[51] Int. Cl.² ............................................. C03B 37/02
[52] U.S. Cl. ............................................. 65/1; 65/2; 65/135; 65/346
[58] Field of Search ................ 65/1, 2, 11 W, 346, 65/135

[56] References Cited

U.S. PATENT DOCUMENTS

| 3,048,640 | 8/1962 | Glaser | 65/2 |
| 3,390,972 | 7/1968 | Froberg | 65/1 |
| 3,492,104 | 1/1970 | Glaser | 65/2 X |
| 3,556,753 | 1/1971 | Glaser | 65/2 |
| 3,837,823 | 9/1974 | Shealy | 65/1 |
| 3,905,790 | 9/1975 | Strickland | 65/2 |
| 3,979,195 | 9/1976 | Strickland | 65/1 |
| 3,982,915 | 9/1976 | Coggin | 65/1 |
| 3,985,503 | 10/1976 | Hynd | 65/2 X |
| 3,986,853 | 10/1976 | Coggin et al. | 65/2 |
| 3,988,135 | 10/1976 | Coggin | 65/1 |

Primary Examiner—Robert L. Lindsay, Jr.
Attorney, Agent, or Firm—Ronald C. Hudgens; Philip R. Cloutier; Kenneth H. Wetmore

[57] ABSTRACT

The disclosure embraces a method of and apparatus for processing heat-softened fiber-forming mineral material, such as glass, to form fibers or filaments and particularly embraces a bushing block arrangement having one or more glass flow passages configurated to provide a minimum of contact of the bushing block with the glass in the flow passage or passages to stabilize the operating characteristics of a bushing or stream feeder, effect conservation of heat and improve bushing performance.

25 Claims, 13 Drawing Figures

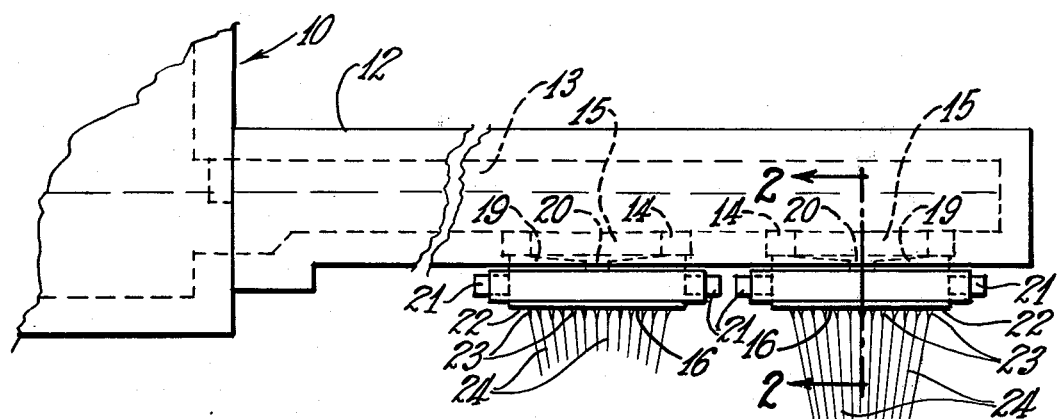
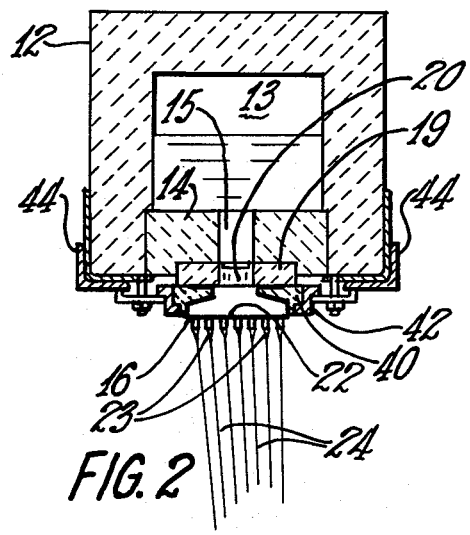
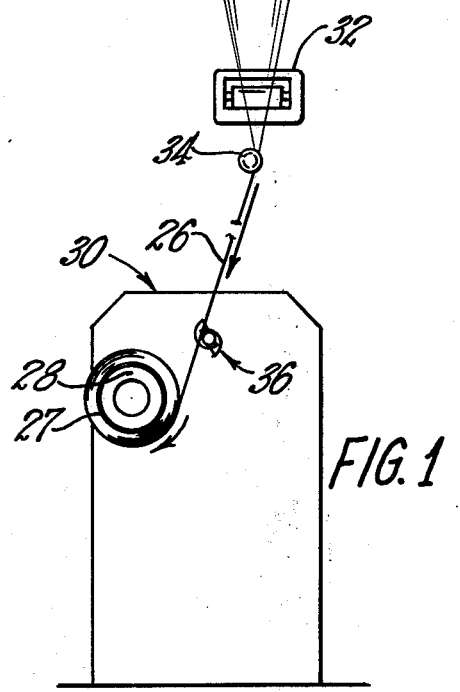
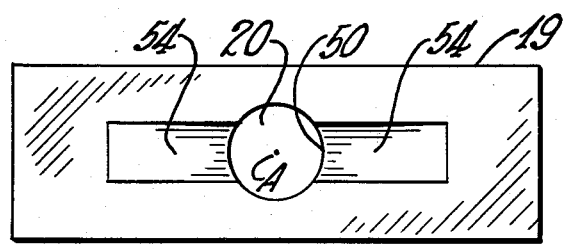
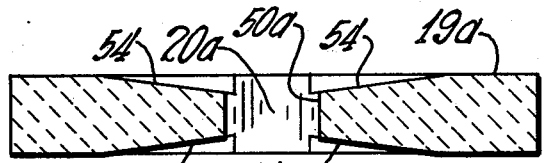
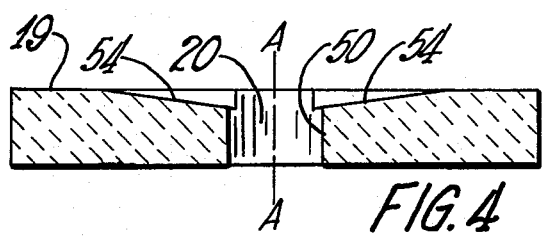

METHOD AND APPARATUS FOR PROCESSING HEAT-SOFTENED FIBER-FORMING MATERIAL

The invention relates to a method of and apparatus for processing heat-softened mineral material, such as glass, wherein the heat-softened glass is conveyed from a forehearth channel or other supply of glass into a stream feeder or bushing through a flow passage or passage means in a bushing block configurated to efficiently and effectively transfer the glass from the forehearth into the bushing in a manner to conserve heat, to render the glass more thermally stable, and improve bushing performance.

It has been conventional practice in methods or processes of attenuating glass streams flowing from orifices in a stream feeder or bushing into fibers or filaments to utilize a bushing block of refractory disposed between the forehearth and the stream feeder or bushing, the bushing block having a rectangular-shaped opening or passage elongated lengthwise of the bushing through which glass from the forehearth flows into the bushing.

The elongated passage or opening in a conventional bushing block has a comparatively large surface area in contact with the glass resulting in substantial loss of heat from the glass and a tendency to promote thermal instability which may affect the flow of uniform streams of glass from the orifices in the bushing. This instability tends to promote filament break-outs and may result in filaments varying in diameters as well as excessive cold or improper yardage at start-up.

This invention relates to a method of and apparatus for conveying glass from a forehearth or other supply of heat-softened glass through a passage or passages in a bushing block into a stream feeder or bushing in a manner to effect conservation of heat and render more stable the process of attenuating streams of glass to fibers or filaments.

An object of the invention resides in a method of flowing heat-softened glass from a forehearth or other glass supply through a passage in a bushing block into a stream feeder or bushing wherein the glass flow passage in the bushing block is configurated to reduce the glass contact heat transfer area to a minimum thereby reducing heat losses.

Another object of the invention is the provision of a bushing block construction disposed between the glass flow channel in a forehearth and the stream feeder or bushing wherein a substantially vertical glass flow passage or passage means in the bushing block is configurated to provide a minimum surface defining the glass flow passage to thereby reduce the area of refractory exposed to erosion processes.

Another object of the invention resides in a bushing block construction having a glass flow passage configurated to effect concentration of flow of hot glass in a region about an axis of the passage whereby the temperature of the glass in the forehearth or other glass supply may be reduced by reason of reduction of heat loss through the bushing block.

A further object of the invention resides in a bushing block construction wherein a bushing block of refractory having a glass flow passage of generally cylindrical configuration is contained within a metal covering, casing or cladding of high temperature resistant metal or alloy and thereby eliminating erosion of the refractory.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIG. 1 is a semischematic elevational view of a forehearth and bushing arrangement embodying one form of bushing block of the invention associated with each bushing;

FIG. 2 is a vertical sectional view taken substantially on the line 2—2 of FIG. 1;

FIG. 3 is a top plan view of one form of bushing block construction of the invention;

FIG. 4 is a longitudinal sectional view of the bushing block construction illustrated in FIG. 3 showing the configuration of the glass flow passage;

FIG. 4a is a sectional view similar to FIG. 4 showing a modified form of bushing block;

Figure 6:
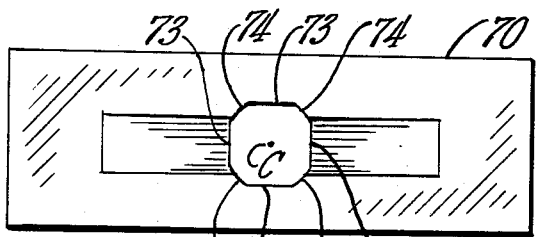
FIG. 6 is a top plan view showing a modified configuration of the glass flow passage in the bushing block.

While the method and apparatus of the invention have particular utility in the processing of glass for forming fibers or filaments from streams of glass, it is to be understood that the method and apparatus may be employed for processing other fiber or filament-forming mineral materials.

Referring to the drawings in detail, FIG. 1 is a semischematic elevational view illustrating a melting furnace and a forehearth construction for supplying heat-softened refined glass to stream feeders or bushings associated with the forehearth. Glass batch is melted and refined in a furnace or tank 10, a forehearth 12 being connected with the melting and refining furnace, the forehearth having a channel 13 containing heat-softened refined glass flowing from the furnace. The glass in the forehearth channel is maintained at the proper temperature by conventional heating means (not shown).

The glass is processed in the furnace and forehearth to render it suitable for attenuation to filaments or fibers. Associated with the forehearth are one or more stream feeders or bushings 16 of hollow rectangular configuration, there being two stream feeders shown in FIG. 1. The forehearth floor adjacent each bushing is provided with a flow block 14 provided with a lengthwise elongated glass flow passage 15 of conventional construction. Disposed between each of the bushings 16 and the adjacent flow block 14 is a bushing block 19 having a glass flow passage 20 of the invention, the passages 15 and 20 accommodating flow of heat-softened glass from the forehearth channel 13 into a bushing. The bushing block will be hereinafter described in detail.

Each of the stream feeders or bushings is fashioned of an alloy of platinum and rhodium or other suitable material capable of withstanding the high temperature of molten glass and is provided at the ends with terminals 21 connected with a supply of electric current for maintaining the desired temperature of the glass in each stream feeder or bushing. The floor 22 of each feeder or bushing is provided with orifices through which flow streams 23 of glass which are attenuated to filaments 24 by winding a strand 26 of the filaments upon a forming tube 27 mounted upon a rotatable collet 28 of a winding machine 30 of conventional construction.

While one winding machine 30 is illustrated in FIG. 1, it is to be understood that a winding machine is provided for winding the strand of filaments attenuated from a group of streams of glass from each of the stream feeders 16. An applicator 32 may be provided for each group of filaments for delivering binder or coating material onto the filaments. The filaments of each group are converged into a strand 26 by a gathering shoe or member 34.

During winding of a strand 26 on a forming tube 27 mounted on the rotatable collet 28, a rotatable and reciprocable traverse means 36 of conventional construction engages the strand for distributing the strand lengthwise on the forming tube to form a package in a conventional manner. Each bushing 16 is surrounded or embraced by refractory 40, as shown in FIG. 2, the refractory 40, the bushing block 19, and the bushing 16 being supported by members 42 secured to a frame or support means 44 for the forehearth 12.

The bushing block 19 functions to thermally isolate a bushing or stream feeder from the forehearth. In prior constructions a bushing block has been fashioned with an elongated rectangular opening substantially equal in length to that of the bushing or stream feeder and is comparatively narrow with respect to its length. One form of bushing block 19 of the invention is illustrated in FIGS. 2, 3 and 4. The bushing block 19 is fashioned of suitable high temperature resistant refractory and extends substantially the length of a stream feeder or bushing 16.

The central region of the bushing block 19 is provided with a substantially cylindrical passage or flow passage 20 which is defined by a substantially circular cylindrical surface 50. The circular cylindrical surface 50 is generated about an axis A—A which is substantially normal to the plane of a major surface of the bushing block, that is, a substantially vertical axis with respect to the horizontal position of the bushing block and centrally of the bushing block as shown in FIGS. 3 and 4.

To function successfully, the flow capacity of the passage 20 in the bushing block should be greater than or equal to the discharge capacity of the bushing so that the bushing and not the flow passage controls the throughput of glass. The upper portion of the bushing block 19 may be fashioned with angularly disposed or ramp surfaces 54 to facilitate flow of glass from the forehearth to the passage 20 with a minimum of resistance. It is to be understood that the ramp surfaces 54 may be eliminated if desired.

Several advantages are attained in utilizing a generally circular cylindrical passage 20 in a bushing block for transferring glass from a forehearth channel into a bushing. The circular cylindrical flow passage provides for a maximum volume of flow of glass from a forehearth channel into a stream feeder with a minimum of area contact of the surface defining the flow passage with the glass.

This construction effects a saving in heat because there is a minimum loss of heat from the glass in its transfer from the forehearth into the stream feeder or bushing. It is found that this saving in heat enables reduction of temperature of the glass in the forehearth without affecting the glass flow. The minimum area of the surface 50 of the flow passage reduces the area of the refractory exposed to erosion processes.

The use of a substantially circular cylindrical glass flow passage 20 in the bushing block to supply the glass to the bushing effects a decreased residence time of the glass in the flow passage 20. While the effects of a substantially circular cylindrical type of glass flow passage in the bushing block may not be fully understood, it is found that there is vastly improved performance of the stream feeder or bushing. The temperature of the glass throughout the stream feeder is more stable.

In the start-up of a wound package, it is found that the time of the cold start yardage period, that is, the time period in which the attenuated filaments reach a normal size is substantially reduced. Hence, a larger amount of substantially uniform diameter filaments are wound into a package. During start-up it has been found that normal filament attenuating characteristics are attained in a reduced period of time by reason of a faster transient response of the glass in the flow passage in the bushing block.

Another unobvious advantage derived through the use of the bushing block construction of the invention is that the number of filament break-outs per unit of time of operation is greatly reduced. Thus an effective saving of time required for re-starts coupled with the loss of incomplete packages of strands effects substantial savings in the processing of the heat-softened glass into packages of strands of glass fibers or filaments.

FIG. 4a illustrates a modification of the bushing block which is similar to FIG. 4. In FIG. 4a the bushing block 19a is fashioned with a central glass flow passage 20a defined by a cylindrical surface 50a. The upper portion of the bushing block 19a is fashioned with angularly disposed or ramp surfaces 54 of the character illustrated in FIG. 4 to facilitate flow of glass from the forehearth to the passage 20a with a minimum of resistance. The bushing block 19a at its lower portion is fashioned with angularly disposed ramp surfaces 54a. The regions beneath the ramp surfaces 54a minimize any tendency for the entrapment of gases from the hot glass which may affect the uniform flow of the glass through the stream flow orifices of the bushing.

Figure 5:
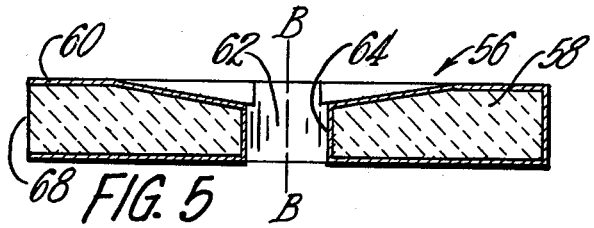
FIG. 5 is a longitudinal sectional view similar to FIG. 4 illustrating a metal casing or covering for the refractory of the bushing block.

FIG. 5 illustrates another form of bushing block 56 in which a body of refractory 58 of the general shape of the bushing block 19 is encased in, surrounded, or cladded by a thin-walled metal enclosure, coating, or shell 60. The enclosure or shell 60 is fashioned of an alloy of platinum and rhodium usually referred to as "H" alloy and has a glass flow passage 62 defined by a substantially cylindrical surface portion 64 providing a circular cylindrical flow passage generated about a central axis B—B.

The thickness of the metal enclosure 60 may be in a range of between fifteen thousandths of an inch and thirty thousandths of an inch or more and is preferably of a thickness of about twenty thousandths of an inch. In fabricating the bushing block construction illustrated in FIG. 5, it is preferable to form the enclosure or shell 60 as a thin-walled hollow member which is open at one end as indicated at 68 to receive castable refractory 58. With the arrangement illustrated in FIG. 5, the refractory 58 does not have contact with the heat-softened glass, and hence the refractory of the bushing block construction is not eroded and contamination of the glass from this source is eliminated. An enclosure or cladding for the bushing block refractory may be applied by flame spraying on the refractory a metal such as molybdenum or other material compatible with the glass.

FIG. 6 illustrates a top plan view of a bushing block 70 fashioned of refractory which is similar to the bushing block 19. In this form the glass flow passage 72 is defined by a surface configuration including planar or flat surfaces 73 joined by curved or arcuate surfaces 74.

The surfaces are substantially equal distances from a central axis "C" and their combined configuration approaches a circular cylindrical form. A glass flow passage 72 defined by the surfaces 73 and 74 is substantially equivalent to a circular cylindrical configuration as the configuration defining the passage 72 approaches the configuration of a flow passage defined by a circular cylindrical surface.

Figure 7:
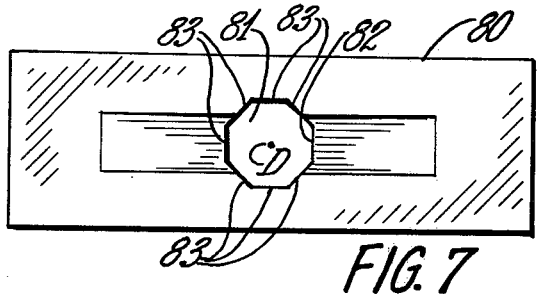
FIG. 7 is a top plan view illustrating a glass flow passage of modified configuration.

FIG. 7 is a top plan view of a bushing block 80 of refractory provided with a flow passage 81. The surface 82 defining the wall region of the passage is of polygonal configuration comprising planar surfaces 83 joined as shown in FIG. 7 to form an octagonal configuration. The polygonal configuration may be fashioned with any number of flat surfaces.

The volume and surface area of the flow passage 81 of polygonal configuration closely approaches the volume and surface area of a circular cylindrical passage, and hence a flow passage 81 of the character shown in FIG. 7 in which the surfaces are substantially equidistant about a central axis "D" has substantially the same characteristics and advantages as a circular cylindrical flow passage.

Figure 8:
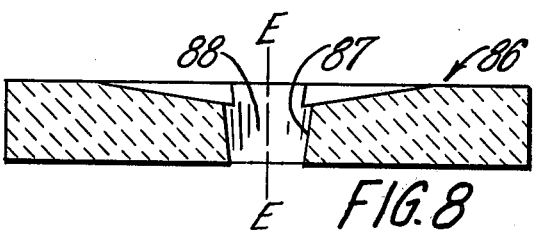
FIG. 8 is a longitudinal sectional view of a bushing block illustrating a frusto-conically shaped glass flow passage in a bushing block.

FIG. 8 illustrates a longitudinal sectional view of a bushing block 86 similar to the bushing block 19. In the bushing block 86 the surface 87 defining the glass flow passage 88 is of frusto-conical shape and is generated about a central axis "EE". The area of the surface defining the glass flow passage 88 is similar to that of a circular cylindrical passage such as that shown in FIGS. 3 and 4 and likewise has a minimum area of surface contact with the glass flowing through the passage 88. The flow passage configuration 88 shown in FIG. 8 provides substantially the same advantages as the other flow passages hereinbefore described.

Figure 9:
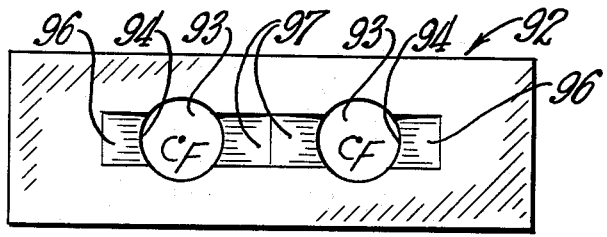
FIG. 9 is a top plan view of a bushing block embodying two glass flow passages.

FIG. 9 illustrates another form of bushing block construction of the invention. The bushing block 92 of refractory is provided with two glass flow passages 93 in lengthwise spaced relation as illustrated. Each of the flow passages 93 is defined by a substantially circular cylindrical surface 94, each surface being generated about a vertical axis "FF". The bushing block is provided with ramp surfaces 96 similar to the ramp surfaces 54 shown in FIGS. 3 and 4, the ramp surfaces 96 converging toward the respective flow passages 93. The combined flow capacity of the passages 93 should be greater than or equal to the discharge capacity of the bushing.

Additional ramp surfaces 97 in the bushing block are in communication with the glass flow passages 93. The ramp surfaces 96 and the ramp surfaces 97 facilitate flow of glass from the forehearth into the passages with a minimum of resistance. In this form, each of the circular cylindrical flow passages 93 provides glass flow with a minimum of surface contact with the bushing block thus minimizing heat losses through the bushing block.

The flow passages 93 attain substantially the advantages of the single flow passages of the other forms of the invention hereinbefore described. The flow passages 93 may be of configurations such as shown in FIGS. 6, 7 and 8, that is, configurations approaching a circular cylindrical configuration shown in FIGS. 3, 4 and 5.

The surfaces of the glass flow passages in the several forms of bushing block are illustrated as generated about vertical axes, but the surfaces defining the flow passages may be generated about axes slightly inclined with respect to vertical axes without appreciably affecting the proper functioning of the flow passages.

Figure 10:
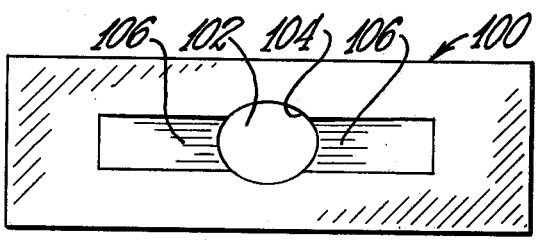
FIG. 10 is a top plan view of a bushing block illustrating a glass flow passage of oval configuration.

FIG. 10 is a plan view of a bushing block construction having a flow passage of a modified configuration. The bushing block 100 is similar to the bushing block 19 shown in FIG. 3. The flow passage 102, shown in FIG. 10, is defined by an oval configuration 104 which is preferably of a shape approaching a circular cylindrical configuration and therefore the surface approaches a minimum surface area in contact with the glass flowing through the passage 102. The bushing block 100 may be provided with angular or ramp surfaces 106 similar to the ramp surfaces 54 shown in FIGS. 3 and 4.

Figure 11:
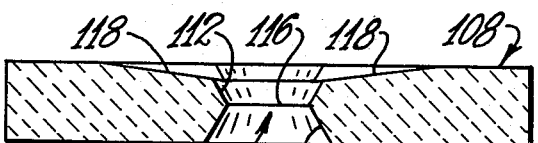
FIG. 11 is a longitudinal sectional view of a bushing block illustrating another form of glass flow passage.

FIG. 11 is a longitudinal sectional view illustrating a bushing block construction having a modified form of glass flow passage therein. The bushing block 108 of refractory has a glass flow passage 110 defined by a configuration comprising an upper frusto-conical configuration 112 and a lower frusto-conical configuration 114. The minimum diameters of the frusto-conical configurations are coincident as indicated at 116.

The frusto-conical surfaces or configurations 112 and 114 define the passage 110, the contour of the passage simulating in a measure a Venturi-like shape, the passage 110 of this character enhancing flow of glass through the passage with a minimum of resistance. The bushing block 108 may be fashioned with ramp surfaces 118 similar to the ramp surfaces 54 shown in FIG. 4 for facilitating flow of glass from the supply to the passage 110 with a minimum of resistance.

Figure 12:
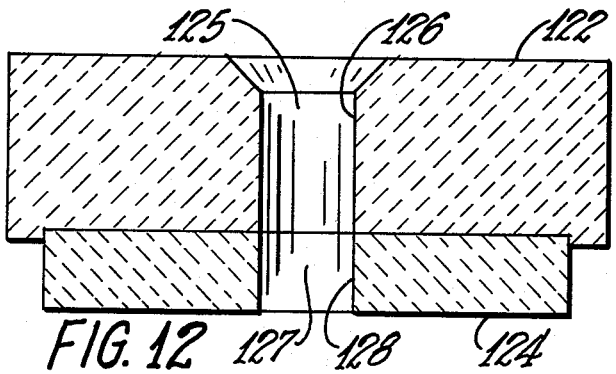
FIG. 12 is a longitudinal sectional view illustrating a forehearth flow block and bushing block having registering flow passages of substantially the same configuration.

FIG. 12 is a sectional view illustrating a forehearth flow block and a bushing block arrangement having registering glass flow passages. The forehearth flow block 122 is in contiguous engagement with a bushing block 124. The flow block 122 is fashioned with a flow passage 125 defined by a circular cylindrical surface 126 which is in registration with a flow passage 127 provided in the bushing block 124 which is defined by a circular cylindrical surface 128.

The configurations 126 and 128 are preferably of the same shape so as to provide a smooth glass flow channel comprising the passages 125 and 127 in the flow block and bushing block respectively. While the passageways 125 and 127 are illustrated as defined by circular cylindrical configurations 126 and 128, it is to be understood that other configurations of passages such as those shown in the bushing blocks in FIGS. 6, 7, 8, 10 and 11 may be utilized for the passages 125 and 127 shown in FIG. 12.

It is to be understood that the forms of bushing block refractory disclosed in FIGS. 6, 7, 8, 9, 10 and 11 may be enclosed or encased in a hollow metal body of an alloy of platinum and rhodium in the manner illustrated in FIG. 5, or the block of refractory coated or cladded with another metal or material compatible with the glass.

It is apparent that, within the scope of the invention, modifications and different arrangements may be made other than as herein disclosed, and the present disclosure is illustrative merely, the invention comprehending all variations thereof.

We claim:

1. The method of processing heat-softened mineral material including establishing a body of the material for delivery into a bushing having orifices through which material flows from the bushing, flowing material from the body through an opening in a flow block, thermally isolating the material in the bushing from the body of material by a bushing block, flowing the material from the bushing through the orifices as fine streams, and concomitantly flowing material from the opening in the flow block through a substantially cylindrical passage in the bushing block into the bushing wherein the flow capacity of the passage in the bushing block is substantially equal to but not less than the flow capacity of all of the orifices.

2. The method of processing heat-softened mineral material including establishing a body of the material for delivery into a bushing having orifices through which material flows from the bushing, flowing material from the body through an opening in a flow block, thermally isolating the material in the bushing from the body of material by a bushing block, flowing the material from the bushing through the orifices as fine streams, and concomitantly flowing material from the opening in the flow block through a substantially cylindrical passage in the bushing block into the bushing, the passage in the bushing block being of lesser cross sectional area than the cross sectional area of the opening in the flow block and having a flow capacity substantially equal to but not less than the flow capacity of all of the orifices.

3. The method of processing heat-softened mineral material including establishing a body of the material for delivery into a bushing having orifices through which material flows from the bushing, flowing material from the body through an opening in a flow block, thermally isolating the material in the bushing from the body of material by a bushing block, flowing the material from the bushing through the orifices as fine streams, and concomitantly flowing material from the opening in the flow block into the bushing through a passage in the bushing block of lesser cross sectional area than the cross sectional area of the opening in the flow block and defined by a surface approaching a circular cylindrical configuration.

4. The method of processing heat-softened glass including establishing a body of the heat-softened glass for delivery into a bushing having orifices through which glass flows from the bushing, flowing glass from the body through an opening in a flow block, thermally isolating the glass in the bushing from the body of glass by a bushing block, flowing glass from the bushing through the orifices as fine streams, and concomitantly flowing glass of the body from the opening in the flow block into the bushing through a passage in the bushing block of lesser cross sectional area than the cross sectional area of the opening in the flow block and defined by a surface approaching a circular cylindrical configuration.

5. The method of processing heat-softened fiber-forming mineral material including flowing the mineral material from a melting furnace along a forehearth channel for delivery into a bushing having orifices through which material flows from the bushing, flowing material from the body through an opening in a flow block, thermally isolating the material in the bushing by a bushing block of refractory from the material in the channel, flowing the material from the bushing through the orifices as fine streams, and flowing the material from the channel into the bushing through the opening in the flow block and through a passage in the bushing block defined by a substantially circular cylindrical surface whereby to effect concentration of material flow through the passage at the central region of the passage.

6. Apparatus for processing heat-softened glass, in combination, a forehearth containing glass from a melting furnace, said forehearth having a flow block provided with a substantially circular cylindrical glass flow passage, a bushing having orifices through which flow streams of glass, a bushing block disposed between the flow block and the bushing having a substantially circular cylindrical glass flow passage in registration with the glass flow passage in the flow block, the flow passages providing a channel for conveying glass from the forehearth into the bushing.

7. The method of processing heat-softened glass including flowing the glass along a forehearth channel for delivery into a bushing having orifices through which glass flows from the bushing, flowing glass from the body through an opening in a flow block, thermally isolating the glass in the bushing by a bushing block from the glass in the channel, flowing the glass from the bushing through the orifices as fine streams, and flowing the glass into the bushing from the opening in the flow block through a passage in the bushing block defined by a configuration approaching a circular cylindrical surface.

8. The method of processing heat-softened glass including flowing the glass along a forehearth channel for delivery into a bushing having orifices through which glass flows from the bushing, thermally isolating the glass in the bushing by a bushing block from the glass in the channel, flowing the glass from the bushing through the orifices as fine streams, and flowing the glass from the forehearth channel into the bushing through an opening in a flow block and through a passage in the bushing block, the passage being of polygonal configuration having not less than five angles.

9. The method of processing heat-softened mineral material including establishing a body of the material for delivery into a bushing having orifices through which material flows from the bushing, thermally isolating the material in the bushing from the body of material by a bushing block, flowing the material from the bushing through the orifices as fine streams, and concomitantly flowing material of the body through an opening in a flow block and through spaced passages in the bushing block into the bushing, the passages in the bushing block having a combined flow capacity substantially equal to but not less than the flow capacity of all of the orifices.

10. The method of processing heat-softened glass including establishing a body of the heat-softened glass for delivery into a bushing having orifices through which glass flows from the bushing, thermally isolating the glass in the bushing from the body of glass by a bushing block, flowing glass from the bushing through the orifices as fine streams, and concomitantly flowing glass of the body through an opening in a flow block and through two spaced passages in the bushing block into the bushing wherein each passage is of substantially cylindrical configuration, the passages in the bushing block having a combined flow capacity substantially equal to but not less than the flow capacity of all of the orifices.

11. Apparatus for processing heat-softened fiber-forming mineral material, in combination, means containing a supply of heat-softened material, a flow block associated with the supply means and having an opening, a bushing, a bushing block disposed between the bushing and the flow block, the bushing having orifices through which streams of material are discharged, said bushing block having passage means accommodating flow of heat-softened material from the opening in the flow block into the bushing, the passage means being shaped to approach minimum area of contact with the material, the passage means having a flow capacity substantially equal to but not less than the flow capacity of all of the orifices.

12. Apparatus for processing heat-softend glass, in combination, means containing a supply of heat-softened glass, a flow block associated with the supply means and having an opening, a bushing, a bushing block of refractory disposed between the bushing and the flow block, the bushing having orifices through which streams of glass are discharged, said bushing block having passage means through which heat-softened glass flows from the opening in the flow block into the bushing, the passage means being configured to accommodate flow of glass wherein the surface area defining the passage means approaches a minimum area of contact with the glass.

13. Apparatus for processing heat-softened glass, in combination, means containing a supply of heat-softened glass, a flow block associated with the supply means and having an opening, a bushing, a bushing block disposed between the bushing and the flow block, the bushing having orifices through which streams of glass are discharged, said bushing block having a passage through which glass flows from the opening in the flow block into the bushing, the passage being of substantially cylindrical configuration, the passage being of less cross sectional area than that of the opening in the flow block and having a flow capacity substantially equal to but not less than the flow capacity of all of the orifices.

14. The apparatus according to claim 13 wherein the means containing a supply of heat-softened glass is a forehearth connected with a glass melting furnace.

15. The apparatus according to claim 13 wherein the flow passage in the bushing block is of polygonal configuration having not less than five angles.

16. The apparatus according to claim 13 wherein the surface defining the flow passage in the bushing block is of oval configuration.

17. The apparatus according to claim 13 wherein the passage in the bushing block is of frusto-conical configuration.

18. The apparatus according to claim 13 wherein the passage in the bushing block comprises two mating frusto-conical configurations.

19. The apparatus according to claim 13 wherein the bushing block is of refractory, said refractory having a coating of metallic material.

20. The apparatus according to claim 13 wherein the bushing block is of refractory, and a casing of an alloy of platinum and rhodium substantially surrounding the refractory.

21. The apparatus according to claim 13 wherein the upper surface of the bushing block has ramp surfaces converging toward the passage.

22. The apparatus according to claim 13 wherein the lower surface of the bushing block has ramp surfaces converging toward the passage.

23. Apparatus for processing heat-softened glass, in combination, a forehearth having a channel containing glass from a melting furnace, a flow block having an opening in communication with the channel, a bushing having orifices through which flow streams of glass, a bushing block disposed between the flow block and the bushing, said bushing block having a passage through which glass flows from the opening in the flow block into the bushing, the passage being defined by a circular cylindrical surface.

24. Apparatus for processing heat-softened glass, in combination, a forehearth having a channel containing glass from a melting furnace, a flow block having an opening in communication with the channel, a bushing having orifices through which flow streams of glass, a bushing block disposed between the flow block and the bushing, said bushing block having spaced passages through which glass flows from the opening in the flow block into the bushing, said passages being defined by cylindrical surfaces, the passages in the bushing block having a combined flow capacity substantially equal to but not less than the flow capacity of all of the orifices.

25. The apparatus according to claim 6 wherein the passages in the flow block and the bushing block are of the same diameters.

* * * * *